United States Patent [19]

Roe

[11] Patent Number: 4,971,720
[45] Date of Patent: * Nov. 20, 1990

[54] METHOD FOR SUPPRESSING PROCESS DUST EMISSIONS

[75] Inventor: Donald C. Roe, Southampton, Pa.

[73] Assignee: Betz Laboratories, Trevose, Pa.

[ * ] Notice: The portion of the term of this patent subsequent to Jan. 30, 2007 has been disclaimed.

[21] Appl. No.: 209,948

[22] Filed: Jun. 22, 1988

Related U.S. Application Data

[63] Continuation-in-part of Ser. No. 41,902, Apr. 24, 1987, Pat. No. 4,897,218.

[51] Int. Cl.$^5$ .......................... C09K 3/22; C04B 7/48
[52] U.S. Cl. .................. 252/313.1; 252/307; 252/88; 252/382
[58] Field of Search .................. 252/307, 313.1, 88, 252/382

[56] References Cited

U.S. PATENT DOCUMENTS

| | | | |
|---|---|---|---|
| 3,186,943 | 6/1965 | Barthauer | 252/3 |
| 4,067,818 | 1/1978 | Marin | 252/88 |
| 4,369,121 | 1/1983 | Callahan et al. | 252/88 |
| 4,380,459 | 4/1983 | Netting | 55/87 |
| 4,400,220 | 8/1983 | Cole, Jr. | 134/18 |
| 4,551,261 | 11/1985 | Salihar | 252/88 |
| 4,561,905 | 12/1985 | Kittle | 134/25 |
| 4,650,598 | 3/1987 | Roberts et al. | 252/28 |
| 4,780,143 | 10/1988 | Roe | 252/88 X |
| 4,780,233 | 10/1988 | Roe | 252/88 |
| 4,897,218 | 1/1990 | Roe | 252/313.1 |

FOREIGN PATENT DOCUMENTS 566788  8/1977  U.S.S.R. .

*Primary Examiner*—Robert L. Stoll
*Assistant Examiner*—Gary L. Geist
*Attorney, Agent, or Firm*—Davis, Hoxie, Faithfull & Hapgood

[57] ABSTRACT

Foam is formed from a solution of demineralized makedown water and foaming agent, and the foam contacted with solid materials to suppress process dust emissions. The foaming agent may be a low salt tolerant surfactant which loses its surface active properties in typical aqueous process streams, or end uses, thereby minimizing subsequent foam related problems. The low salt tolerant surfactant may be part of a combination of components for forming foam which is low salt tolerant.

25 Claims, 2 Drawing Sheets

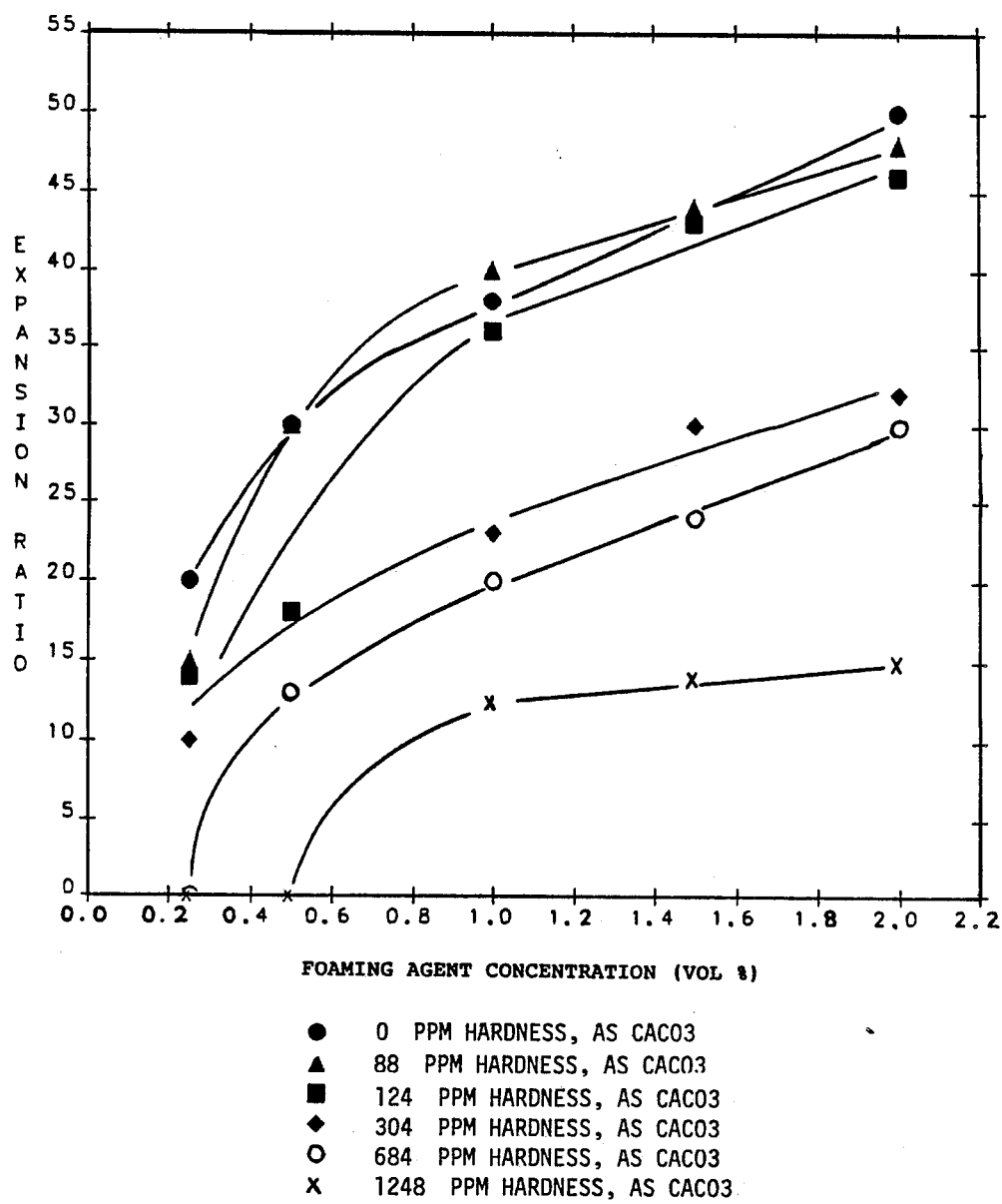

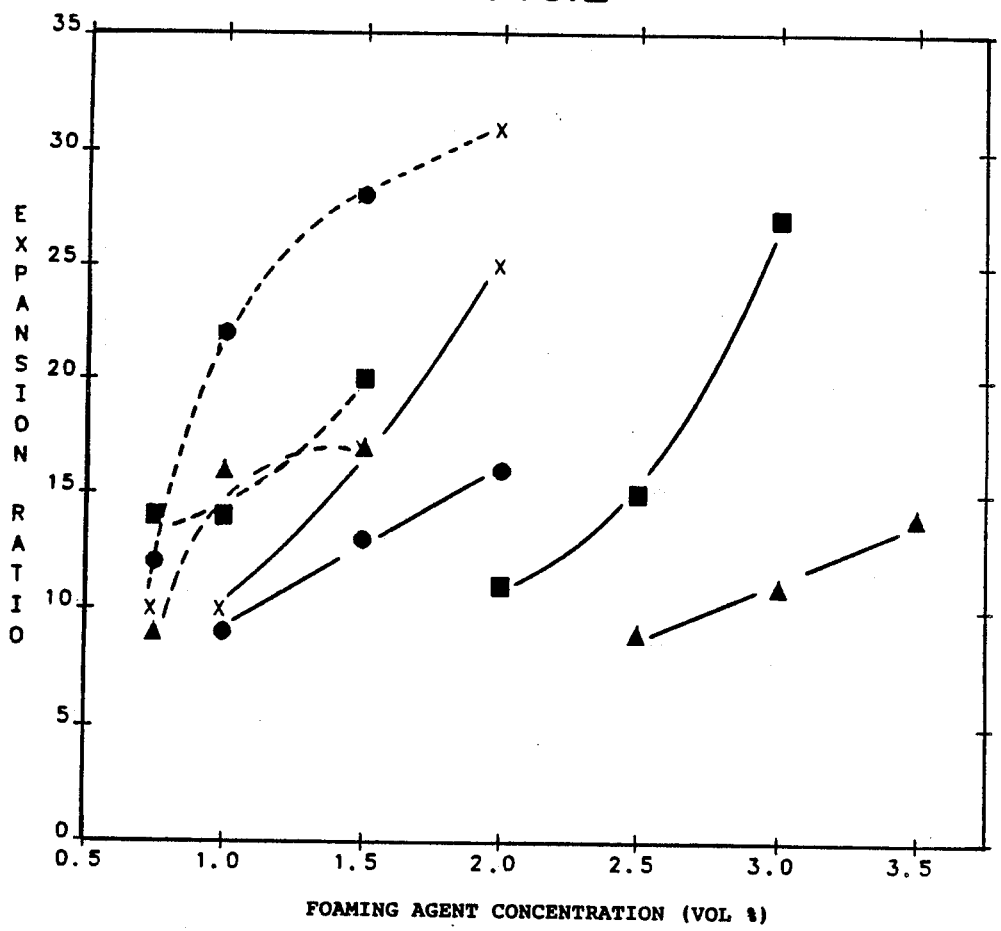

METHOD FOR SUPPRESSING PROCESS DUST EMISSIONS

FIELD OF THE INVENTION

This invention relates to a method for using foam to suppress process dust emissions.

DESCRIPTION OF THE PRIOR ART

As used in this application, the term "process dust" refers to fugitive dust particles generated during typical processing of solid materials. Dust generation is of concern, for example, in coal mining, cement production, and metal ore refining. Suppression of such process dusts is desirable for safety and health reasons.

The use of foam to suppress process dust has been found to be effective in that a high percentage of fine particles may be captured by the foam and prevented from becoming airborne. The use of foam to suppress dust was described in U.S. Pat. No. 4,400,220 to Cole, which patent is hereby incorporated by reference. That patent describes methods of generating foam and applying it to prevent respirable dust from becoming airborne. In particular, the patent describes a method of applying foam to coal dust.

U.S. Pat. No. 3,186,943 to Barthauer describes a method of generating foam for use in fire fighting by using foaming agents and available water of different hardnesses, from soft to very hard.

However using foam to suppress process dust according to the methods of the prior art has the disadvantage that the foam may give rise to other problems during the subsequent aqueous processing of the solid materials. For example, foam is not generally used to suppress process dust in gold ore processing for this reason. In that process, gold ore is crushed and then caustic cyanide solution is used to extract gold from the ore. Traditional foaming agents, when applied to the gold ore during the crushing operation, can cause problems in the gold extraction process. In particular, in the Merrill-Crow process, pregnant (gold containing) solution is deaerated prior to a zinc precipitation step. Severe foaming problems have been noted during deaeration if the ore has previously been subjected to foam treatment to suppress process dust.

Similarly, foam may affect the quality of the final product. For example, despite the effectiveness of foam in controlling dust emissions in the production of Portland cement, foam may produce entrained air in the resulting hydrated cement products. This may cause variation from air entrainment standards, and the entrapped air may also cause compressive strength reduction and structural failure of the cement.

In addition, the types of foaming agent formulations used to form dust suppressing foam are limited by the hardness of the water available at many plant locations. Thus, for example, in a cement rock quarry where cement is made, well water or recycled plant water is used to form foam for dust suppression and only high salt tolerant foam formulations are employed. These formulations may contain surfactants which are themselves high salt tolerant, or if low salt tolerant surfactants were used, they would have to be combined with other components to form a combination which had high salt tolerance.

SUMMARY OF THE INVENTION

In accordance with the present invention a solution is formed of demineralized make-down water and foaming agent. Foam is then formed from the solution, and the foam contacted with solid materials to suppress process dust emissions. The foaming agent may be a low salt tolerant surfactant which loses its surface active properties in typical aqueous process streams, or end uses, thereby minimizing subsequent foam related problems.

BRIEF DESCRIPTION OF THE DRAWINGS

FIG. 1 shows a graph of expansion ratio vs. surfactant concentration for Example 1.

FIG. 2 shows a graph of expansion ratio vs. surfactant concentration for Example 2.

DESCRIPTION OF THE PREFERRED EMBODIMENT

According to the invention, make-down water is demineralized before being used to generate foam for dust suppression.

The demineralization step of the invention is performed by a variety of means known to those familiar with the art. Demineralization techniques include dual bed cation and anion exchange, single bed cation exchange, and reverse osmosis. All of these techniques remove cations, such as $Ca^{++}$ and $Mg^{++}$, which cause water hardness. Dual bed cation exchange and reverse osmosis are preferred since they do not introduce, during exchange any cation, such as sodium, which might also interfere with foaming.

Water demineralized according to the invention will have reduced hardness. The demineralized make-down water will have generally from zero to less than about 50 parts per million, preferably less than about 10 parts per million, and most preferably less than about 1 part per million of hardness, expressed as dissolved $CaCO_3$.

Following the demineralization step, a surfactant which is a foaming agent is added to the make-down water to form an aqueous surfactant solution.

The concentration of the surfactant is generally between about 0.05% and 0.5% by weight of active surfactant, with a preferred concentration of between about 0.1% and 0.25%.

Foam is then formed from the make-down water/foaming agent solution.

Various types of foam generating apparatus may be used. Typical apparatus for foam generation is described in U.S. Pat. No. 4,400,220 discussed above. Such apparatus includes chain-in-pipe static mixers, and packed columns. Other apparatus is well known to those familiar with the art.

The foam generated will have a bubble size effective in wetting process dust and preventing the dust from becoming airborne. Such foam generally has a bubble size of between 25 and 500 microns, though a bubble size of between 100 and 200 microns is preferable. The foam is applied by conventional means, e.g. by spraying, on to solid materials which require dust prevention treatment.

Because demineralized water is used to form the foam, less surfactant is required. Since less surfactant is used there will be less objectionable foam formed during subsequent aqueous processing or aqueous end use. For example, foam may be formed using a purified water foam generating system and then applied to solid materials such as coal, mineral ores, or cement clinker. These solids then may be subjected to aqueous processing such as leaching, washing, gravity separation, or flotation in which the hardness of the water will be increased. Since less foaming agent was used for dust control there will be less foam formed in the aqueous process and fewer foam related problems downstream or in the end use.

In addition the demineralization of make-down water allows for cost savings by significantly reducing the amount of foaming agent which is required to make a high quality dust control foam.

The invention includes the use of traditional foaming agents, including anionic, cationic and non-ionic surfactants regardless of their salt tolerance. However preferably, the surfactants have low salt tolerance. Low salt tolerant surfactants will form high quality foam in water of reduced hardness, but have significantly reduced foaming properties in typical downstream process waters and aqueous end uses compared with traditional foaming agent surfactants. Typical process waters generally have a hardness greater than about 50 ppm of dissolved $CaCO_3$.

Some of these low salt tolerant surfactants will only foam in very pure water, and therefore water purification is required for their use in generating foam. On contact with typical aqueous process waters, such as those mentioned above, low salt tolerant surfactants will lose much or all of their foaming ability, thereby significantly reducing foaming problems.

Thus, while the use of a purified water foam generating system with traditional surfactant will reduce foaming problems, the combined use of a purified water foam generating system and low salt tolerant foaming agent is considered optimum for controlling process dust emissions.

Low salt tolerant foaming agents which may be used according to the invention are normally anionic surfactants. Preferred anionic low salt tolerant surfactants may be salts of fatty acids, alkyl sulfates and alkyl aryl sulfonates. The fatty acid salts and alkyl sulfates have between about 8 and about 18 carbons. Alkyl aryl sulfonates will normally have from about 14 to about 24 carbon atoms. In particular, sodium laurate, sodium oleate, sodium lauryl sulfate and amine dodecyl benzene sulfonate are preferred since these surfactants will only foam in low hardness water and thus will foam little, if at all, in typical aqueous process waters. Commercially available examples of suitable low salt tolerant surfactants are sodium oleate, sold as "Norfox S0" by Norman, Fox and Co.; sodium laurate sold by Witco Corp.; sodium lauryl sulfate, sold as "Witcolate A" by Witco Corp.; and isopropylamine dodecyl benzene sulfonate, sold as Witconate P1059 by Witco Corp.

The method of the invention is particularly useful in allowing the use of low salt tolerant surfactant without the addition of the other agents required for using low salt tolerant surfactant in hard water. Thus, plant process water, or well water which contains high levels of hardness may be demineralized according to the invention, and foam formed from low salt tolerant surfactant without the addition of components such as a lime soap dispersants which may be required for forming quality foam with low salt tolerant surfactant in these waters.

According to one aspect of the invention, a low salt tolerant surfactant may be combined with other components to form a foam forming formulation which is low salt tolerant. This foam forming formulation may contain foam boosters and stabilizers, wetting agents and different foaming agents in a combination which is usable to form quality foam only in low salt water. In a preferred embodiment the low salt tolerant foaming agent is used to form foam without the presence of components which permit the of quality foam in water having a salt content higher than about 50 ppm of dissolved $CaCO_3$.

Processes according to the invention also include the use of low salt tolerant formulations which contain more than one surfactant. Such formulations may contain more than one low salt tolerant surfactant. An example is a formulation which contains two or more of a salt of a fatty acid, an alkyl sulfate and an alkyl aryl sulfonate. Such formulations also may contain surfactants which are not considered low salt tolerant by themselves, but which, with other surfactants and other components form a combination which is low salt tolerant.

The following examples are illustrative of the invention, and are not intended to limit the scope of the invention in any way.

EXAMPLE 1

The following experiment demonstrated that a laboratory scale purified water foam generating system significantly reduces the amount of foaming agent required to produce dust control quality foam.

A laboratory scale dual bed ion exchange apparatus was used to obtain deionized foaming agent make-down water. Varying hardness concentrations of make-down water were then obtained by metering a concentrated brine solution containing calcium and magnesium chloride salts at a ratio of 2:1, (Ca:Mg) into the deionized foaming agent make-down water. Foam was generated using compressed laboratory air, make-down water, and a foaming agent formulation. The foaming agent formulation used was a traditionally used product having moderate salt tolerance.

Expansion ratio was then determined with make-down water of different degrees of hardness and at various foaming agent concentrations. Expansion ratio is defined as the volume of foam produced per unit volume of liquid. High quality foam typically has an expansion ratio of about 30.

The results are shown in Table 1 and FIG. 1. They demonstrated that less foaming agent was required to produce high quality foam when make-down water was run through a laboratory scale water purifier.

TABLE 1

| Test # | Water Hardness (ppm as $CaCO_3$) | Foaming Agent Conc. (%) | Expansion Ratio |
|---|---|---|---|
| 1 | 0 | 2.0 | 50 |
| 2 | 0 | 1.5 | 43 |
| 3 | 0 | 1.0 | 38 |
| 4 | 0 | 0.5 | 30 |
| 5 | 0 | 0.25 | 20 |
| 6 | 88 | 2.0 | 48 |
| 7 | 88 | 1.5 | 44 |
| 8 | 88 | 1.0 | 40 |
| 9 | 88 | 0.5 | 30 |
| 10 | 88 | 0.25 | 15 |
| 11 | 124 | 2.0 | 46 |
| 12 | 124 | 1.5 | 43 |
| 13 | 124 | 1.0 | 36 |
| 14 | 124 | 0.5 | 18 |
| 15 | 124 | 0.25 | 14 |
| 16 | 304 | 2.0 | 32 |
| 17 | 304 | 1.5 | 30 |

TABLE 1-continued

| Test # | Water Hardness (ppm as CaCO3) | Foaming Agent Conc. (%) | Expansion Ratio |
|---|---|---|---|
| 18 | 304 | 1.0 | 23 |
| 19 | 304 | 0.5 | 18 |
| 20 | 304 | 0.25 | 10 |
| 21 | 684 | 2.0 | 30 |
| 22 | 684 | 1.5 | 24 |
| 23 | 684 | 1.0 | 20 |
| 24 | 684 | 0.5 | 13 |
| 25 | 684 | 0.25 | — |
| 26 | 1248 | 2.0 | 15 |
| 27 | 1248 | 1.5 | 14 |
| 28 | 1248 | 1.0 | 12 |
| 29 | 1248 | 0.5 | — |
| 30 | 1248 | 0.25 | — |

EXAMPLE 2

The following experiment demonstrated that a purified water foam generating system of the scale required for process dust suppression significantly reduces the amount of foaming agent required to produce high quality dust control foam.

A foam generating system was set up employing a field scale water purification system and a by-pass around the water purifier so that foaming agent demand using purified and non-purified make-down water could be compared.

A field single-bed cation exchange resin apparatus was employed to make softened make-down water. Calcium and magnesium salts were added upstream of the water purification system, and the exchange cation (sodium) was therefore included in the purified make-down water. The traditional foaming agent formulation used in Example 1 was also used in this test.

The results of the field foam generator study are given in Table 2 and FIG. 2. "P" in the Table 2 refers to runs using purified water. "T" in the table refers to runs in the "traditional" manner wherein the water purification system was bypassed. Foaming agent demand was significantly reduced using the water purifier as compared with the traditional system, although the presence of sodium in the water appeared to interfere somewhat with foaming.

TABLE 2

| Test # | P/T | Water Hardness (ppm as CaCO3) | Foaming Agent Con. (%) | Expansion Ratio |
|---|---|---|---|---|
| 1 | P | <1.00 | 2.0 | 31 |
| 2 | P | <1.00 | 1.5 | 28 |
| 3 | P | <1.00 | 1.0 | 22 |
| 4 | P | <1.00 | 0.75 | 10 |
| 5 | T | 58.0 | 2.0 | 25 |
| 6 | T | 58.0 | 1.5 | 17 |
| 7 | T | 58.0 | 1.0 | 10 |
| 8 | T | 276 | 2.0 | 16 |
| 9 | T | 276 | 1.5 | 13 |
| 10 | T | 276 | 1.0 | 9 |
| 11 | P | <1.00 | 1.5 | 28 |
| 12 | P | <1.00 | 1.0 | 22 |
| 13 | P | <1.00 | 0.75 | 12 |
| 14 | T | 437 | 3.0 | 27 |
| 15 | T | 437 | 2.5 | 25 |
| 16 | T | 437 | 2.0 | 11 |
| 17 | P | <1.00 | 1.5 | 20 |
| 18 | P | <1.00 | 1.0 | 14 |
| 19 | P | <1.00 | 0.75 | 14 |
| 20 | T | 713 | 3.5 | 14 |
| 21 | T | 713 | 3.0 | 11 |
| 22 | T | 713 | 2.5 | 9 |
| 23 | P | <1.00 | 1.5 | 17 |
| 24 | P | <1.00 | 1.0 | 16 |
| 25 | P | <1.00 | 0.75 | 9 |

EXAMPLE 3

This test demonstrated that high quality foam is generated using either a low salt tolerant foaming agent or a high salt tolerant foaming agent in combination with a purified water foam generating system. This example also demonstrated that low salt tolerant foaming agents lose their foaming properties in water containing as little as 50 ppm CaCO3 and thus will not foam in typical aqueous process streams.

Three commercially available surfactants were used in combination with a purified water foam generating system, for reducing process dust emissions:

| Surfactant | Trade Name | Supplier | Ca Tolerance |
|---|---|---|---|
| Sodium Oleate (SO) | Sodium Oleate | Fisher Scientific Company | Very Low |
| Sodium Lauryl Sulfate (SLS) | Witcolate A | Witco Corp. | Low |
| Alpha Olefin Sulfonate (AOS) | Bioterge AS-40 | Stepan Company | High |

Both SO and SLS are good foamers in soft water, but are not used in traditional foaming agent formulations without the addition of lime soap dispersants and the like due to their reduced foaming properties in typical plant make-down waters. On the other hand, AOS is known to foam even in very hard water and, is a major component in traditional foaming agent formulations. AOS is a blend of alkene sulfonates and hydroxy alkane sulfonates produced by the reaction of $SO_3$ with linear alpha olefins having between 14 and 16 carbons.

0.1% active surfactant solutions were prepared in waters containing varying calcium concentrations and tested for foaminess and foam stability. Surfactant solutions were shaken in graduated centrifuge tubes and the resultant expansion ratio and drainage rate measured. Half-life is defined as the time at which half of the original liquid volume drains from the foam. To minimize operator error, a Burrell Wrist Action Shaker was used to shake the tubes in a uniform and reproducible manner. SO and SLS lost their foaming properties in waters containing as little as 50 ppm $CaCO_3$. These data showed that all three surfactants are effective foaming agents when used in conjunction with a purified water foam generating system, but the low salt tolerant surfactants cause minimum foaming when contacted with a typical aqueous process water containing only low levels of hardness.

TABLE 3

| Sample # | Surfactant | Concentration (% WT Actives) | Water Hardness (ppm as CaCO3) | Half-Life (Seconds) | Expansion Ratio |
|---|---|---|---|---|---|
| 1 | SLS | 0.1 | 0 | 18.94 | 8.4 |
| 2 | SLS | 0.1 | 50 | 0 | 1.8 |
| 3 | SLS | 0.1 | 100 | 0 | 2.2 |
| 4 | SLS | 0.1 | 200 | 0 | 1.6 |
| 5 | SLS | 0.1 | 300 | 0 | 1.6 |

TABLE 3-continued

| Sample # | Surfactant | Concentration (% WT Actives) | Water Hardness (ppm as CaCO3) | Half-Life (Seconds) | Expansion Ratio |
|---|---|---|---|---|---|
| 6 | AOS | 0.1 | 0 | 16.04 | 8.6 |
| 7 | AOS | 0.1 | 50 | 14.00 | 7.8 |
| 8 | AOS | 0.1 | 100 | 16.83 | 6.8 |
| 9 | AOS | 0.1 | 200 | 20.60 | 7.2 |
| 10 | AOS | 0.1 | 300 | 17.50 | 7.4 |
| 11 | SO | 0.1 | 0 | 11.79 | 7.6 |
| 12 | SO | 0.1 | 50 | 0 | 3.2 |
| 13 | SO | 0.1 | 100 | 0 | 0 |
| 14 | SO | 0.1 | 200 | 0 | 0 |
| 15 | SO | 0.1 | 300 | 0 | 0 |

EXAMPLE 4

The following example demonstrated the effectiveness of foams produced using a purified water foam generating system in suppressing process dust.

A laboratory scale purified water foam generating system was used to produce dust control quality foams comprising 0.2% of active SO, SLS and AOS in the aqueous phase. The foams produced were used to treat coal and gold ore process dusts to determine their dust control efficacy. The relative dustiness of the untreated and treated samples of coal and gold ore dusts was measured using a laboratory dust chamber equipped with an opacity monitor. The dusts were sieved and riffled to obtain uniform minus quarter inch samples. An opacity curve was generated of opacity as a function of time, measured after introduction of a dust sample into the dust chamber. The relative dustiness index (RDI) was measured as the area under the opacity curve. Percent dust suppression (% DS) was calculated as (RDI for untreated dust −RDI for treated dust)/RDI for untreated dust ×100.

The results are given in Table 4. All of the surfactants tested effectively controlled process dust emissions, as shown by low relative dustiness indexes, and high percentages of dust suppression.

TABLE 4

| Sample | Treatment[2] | Soln. Concentration (WT % Actives) | Expansion Ratio | Feed[1] Rate (g) | RDI | % DS |
|---|---|---|---|---|---|---|
| Coal | None | 0.2 | — | — | 25.8 | — |
| Coal | SO | 0.2 | 34.9 | 5.0 | 2.0 | 92.2 |
| Coal | SLS | 0.2 | 38.3 | 5.0 | 1.8 | 93.0 |
| Coal | AOS | 0.2 | 39.2 | 5.0 | 1.6 | 93.8 |
| Gold Ore | None | — | — | — | 22.7 | — |
| Gold Ore | SO | 0.2 | 34.9 | 5.0 | 1.1 | 95.2 |
| Gold Ore | SLS | 0.2 | 38.3 | 5.0 | 1.5 | 93.4 |
| Gold Ore | AOS | 0.2 | 39.2 | 5.0 | 0.8 | 96.5 |

[1]Feed rate in g of foam/250 g sample.
[2]SO = sodium oleate; SLS - sodium lauryl sulfate (Witcolate A); AOS = alpha olefin sulfonate (Bioterge AS-40).

EXAMPLE 5

The tests in Examples 5 and 6 demonstrated that low salt tolerant surfactants produce significantly less foam in simulated plant process waters than traditional foaming agents.

In this example, the relative foaming properties of SO, SLS, and AOS were determined in typical coal plant process waters under conditions simulating processes in which foaming is known to occur. In the coal preparation process, foaming due to surfactant additives has been reported in sumps, thickeners and the like due to the transfer, or "pouring" of liquid into liquid. A sample of coal process water was obtained from a West Virginia preparation plant and used in preparing 0.1% active surfactant solutions. The foaminess of the solutions was measured at 20° C. by the Ross-Miles technique, which simulates the action of pouring a liquid into a cylindrical vessel containing the same liquid. The height of the foam produced was measured immediately, and again after 5 minutes to gauge foaminess and foam stability. The results are given in Table 5. They showed that SO and SLS foam less than traditional foaming agent surfactant (AOS) in coal preparation plant process water.

TABLE 5

| Surfactant | Concentration (WT % Actives) | Ross-Miles Foam Height (MM) | |
|---|---|---|---|
| | | Initial | 5 Minutes |
| None | — | 0 | 0 |
| Sodium Oleate | 0.1 | 0 | 0 |
| Sodium Lauryl Sulfate | 0.1 | 38 | 13 |
| Alpha Olefin Sulfonate | 0.1 | 69 | 65 |

EXAMPLE 6

Simulated gold ore process water was prepared by adding lime (CaO) to deionized water to obtain a pH of 11.5. The simulated process water was used in preparing 0.1% active surfactant solutions. The foaminess of the solutions was measured in a simulated deaerator, wherein 10 cc of each solution was added to 50 cc graduated cylinders and placed into a vacuum desiccator. The desiccator was then evacuated using a vacuum pump. The vacuum was increased until degassing occurred. After 1 minute of degassing, the volume of foam produced was recorded. The vacuum was then maintained at a constant value and the foam volume after 1 minute recorded. The results are shown in Table 6. They demonstrated that SO and SLS produce significantly less foam than the traditional AOS foaming agent under simulated gold ore processing conditions.

TABLE 6

| Surfactant | Concentration (WT % Actives) | Foam Volume (CC) | |
|---|---|---|---|
| | | Initial | 5 Minutes |
| None | — | 0 | 0 |
| Sodium Oleate | 0.1 | 0 | 0 |
| Sodium Lauryl Sulfate | 0.1 | 20 | 5 |
| Alpha Olefin Sulfonate | 0.1 | 40 | 10 |

What is claimed is:

1. A process for suppressing process dust emissions in the handling of solid material with foam without forming foam in subsequent aqueous processing, which process comprises
   (a) forming a solution of demineralized make-down water and a foaming agent, which foaming agent is a salt of a fatty acid having between about eight and eighteen carbons;
   (b) forming a foam from the solution;
   (c) contacting the solid material with the foam; and
   (d) inhibiting foam formation in aqueous process media by contacting the foaming agent with dissolved minerals in said media.

2. The process of claim 1 wherein the concentration of the surfactant is between about 0.05% and 0.5% by weight.

3. The process of claim 1 wherein the concentration of the surfactant is between about 0.1% and 0.25% by weight.

4. The process of claim 1 further comprising demineralizing make-down water to form the demineralized water.

5. The process of claim 1 wherein the foaming agent is sodium oleate.

6. The process of claim 1 foaming agent is part of a foam forming formulation comprised of more than one surfactant.

7. The process of claim 1 wherein foam is formed from the solution of demineralized make-down water and foaming agent without the additional presence in the solution of components which permit the forming of quality foam with the low salt tolerant foaming agent in water containing more than about 50 ppm of dissolved $CaCO_3$.

8. The process of claim 1 wherein foam is formed from the solution of demineralized make-down water and foaming agent without the additional presence in the solution of components which permit the forming of quality foam with the low salt tolerant foaming agent in water containing more than about 10 ppm of dissolved $CaCO_3$.

9. The process of claim 1 comprising demineralizing the make-down water by ion exchange.

10. The process of claim 1 comprising demineralizing the make-down water by reverse osmosis.

11. The process of claim 1 comprising demineralizing the make-down water by passing it through a dual bed ion exchanger.

12. The process of claim 1 wherein the demineralized make-down water contains less than about 50 ppm of dissolved $CaCO_3$.

13. The process of claim 1 wherein the demineralized make-down water contains less than about 10 ppm of dissolved $CaCO_3$.

14. The process of claim 1 wherein the demineralized make-down water contains less than about 1 ppm of dissolved $CaCO_3$.

15. The process of claim 1 wherein the solid material is selected from the group consisting of coal, mineral ore, and cement clinker.

16. The process of claim 15 wherein the solid material is a mineral ore which is selected from the group consisting of copper, and gold.

17. In a process in which solid materials are subjected to treatment with a dust suppression medium and are subsequently treated with an aqueous processing medium containing more than 50 ppm of dissolved $CaCO_3$, the improvement which comprises applying as said dust suppression medium a medium formed by dissolving a foaming agent in demineralized water, which foaming agent is a salt of a fatty acid having between about eight and eighteen carbons, wherein foam formation in the aqueous process media is inhibited by contact of the foaming agent with the dissolved $CaCO_3$ in said media.

18. The process of claim 17 wherein the concentration of the surfactant is between about 0.05% and 0.5% by weight.

19. The process of claim 17 wherein the concentration of the surfactant is between about 0.1% and 0.25% by weight.

20. The process of claim 17 further comprising demineralizing make-down water to form the demineralized water.

21. The process of claim 20 wherein the make-down water is comprised of plant process water containing more than about 50 ppm of dissolved $CaCO_3$.

22. The process of claim 20 wherein the make-down water is comprised of well water containing more than about 50 ppm of dissolved $CaCO_3$.

23. The process of claim 20 wherein the aqueous process is leaching, washing, gravity separation, or flotation.

24. The process of claim 20 wherein the aqueous process is the formation of hydrated cement.

25. The process of claim 1 wherein the salt of a fatty acid is sodium laurate.

* * * * *

UNITED STATES PATENT AND TRADEMARK OFFICE
CERTIFICATE OF CORRECTION

PATENT NO. : 4,971,720
DATED : November 20, 1990
INVENTOR(S) : D. C. Roe

It is certified that error appears in the above-identified patent and that said Letters Patent is hereby corrected as shown below:

ON TITLE PAGE:

[*] Notice - Reads as follows in error:

> The portion of the term of this patent subsequent to Jan. 30, 2007 has been disclaimed.

[*] Notice - Should read:

> The portion of the term of this patent subsequent to Oct. 25, 2005 has been disclaimed.

Signed and Sealed this

Tenth Day of August, 1993

Attest:

MICHAEL K. KIRK

Attesting Officer

Acting Commissioner of Patents and Trademarks